(12) United States Patent
Lin et al.

(10) Patent No.: US 12,724,739 B2
(45) Date of Patent: Sep. 1, 2026

(54) POWER BUS CONTROL PROTECTION METHOD AND POWER BUS CONTROL PROTECTION SYSTEM

(71) Applicant: MEDIATEK INC., Hsinchu City (TW)

(72) Inventors: Shu-Ching Lin, Hsinchu City (TW); Ying-Ting Yang, Hsinchu City (TW); Min-Fang Li, Hsinchu City (TW); Ching-Yao Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 19/015,693

(22) Filed: Jan. 10, 2025

(65) Prior Publication Data

US 2026/0203247 A1 Jul. 16, 2026

(51) Int. Cl.
*G06F 15/78* (2006.01)

(52) U.S. Cl.
CPC ................................ *G06F 15/7807* (2013.01)

(58) Field of Classification Search
CPC ......................... G06F 13/4265; G06F 9/45558
See application file for complete search history.

(56) References Cited

U.S. PATENT DOCUMENTS

2003/0110339 A1* 6/2003 Calvignac ........... G06F 13/4265 710/305
2017/0315944 A1* 11/2017 Mayer ..................... G06F 13/24
2023/0342323 A1* 10/2023 Ali ...................... G06F 13/4221
2024/0019494 A1* 1/2024 Dorris ................ G06F 9/45558
2024/0020362 A1* 1/2024 Dorris ................ G06F 9/45558
2025/0005228 A1* 1/2025 Ono ......................... H02J 3/38
2025/0252198 A1* 8/2025 Gothekar ............. G06F 21/606

* cited by examiner

*Primary Examiner* — Getente A Yimer
(74) *Attorney, Agent, or Firm* — Winston Hsu

(57) ABSTRACT

A power bus (P-Bus) control protection method applicable to a System on a Chip (SoC) includes sending a packet by a first subsystem among the control subsystem and the plurality of functional subsystems, wherein the first subsystem is taken as a master device, other subsystems are slave devices, and the packet includes an SoC identifier (ID) and a slave ID utilized to jointly indicate a specific subsystem located in a specific SoC; receiving the packet by a second subsystem as a slave device among the control subsystem and the plurality of functional subsystems through its corresponding P-Bus circuit; decoding the packet by the second subsystem to determine whether the packet is directed to the second subsystem based on the SoC ID and the slave ID carried in the packet; and if the packet is directed to the second subsystem, executing corresponding operations by the second subsystem.

18 Claims, 3 Drawing Sheets

POWER BUS CONTROL PROTECTION METHOD AND POWER BUS CONTROL PROTECTION SYSTEM

BACKGROUND

With the advancement of technologies, various System on a Chip (SoC) designs are popularly adopted in our daily lives. Generally, a SoC includes a plurality of subsystems. The SoC may generate high power leakage when power supplies across the plurality of subsystems are uncontrollable. In order to reduce the SoC leakage, each subsystem is equipped with its own power switch, such as a Multi-Threshold Complementary Metal-Oxide-Semiconductor (MTCMOS), for controlling its power leakage individually. For example, to reduce power consumption of a subsystem, the MTCMOS power supply and platform resource need to be turned off when unused, and turned on when needed.

In the N3 (3 nm-class) family of process technologies, the cost (say, "complexity") of the top wire sideband area of the SoC is exceedingly high. This makes it challenging to fully control the SoC's power leakage. Moreover, when managing different SoC families, a risk of writing unintended data packets to a register of the subsystem (Wrong writing) is unavoidable.

Therefore, developing a reliable power control system for various SoC architectures is a crucial design consideration.

SUMMARY

In an embodiment of the present invention, a power bus (P-Bus) control protection method applicable to a System on a Chip (SoC) is disclosed. The SoC comprises a control subsystem and a plurality of functional subsystems. Each of the control subsystem and functional subsystems has a corresponding P-Bus circuit. All P-Bus circuits form a ring P-Bus. The method comprises sending a packet by a first subsystem among the control subsystem and the plurality of functional subsystems, wherein the first subsystem is taken as a master device to request control of power and/or resources through its corresponding P-Bus circuit, other subsystems are slave devices, and the packet comprises an SoC identifier (ID) and a slave ID, wherein the slave ID is an ID of a target slave device to which the packet is directed, and the SOC ID and the slave ID are utilized to jointly indicate a specific subsystem located in a specific SoC; receiving the packet by a second subsystem as a slave device among the control subsystem and the plurality of functional subsystems through its corresponding P-Bus circuit; decoding the packet by the second subsystem to determine whether the packet is directed to the second subsystem based on the SoC ID and the slave ID carried in the packet; and if the packet is directed to the second subsystem, executing corresponding operations by the second subsystem.

In another embodiment of the present invention, a P-Bus control protection system applicable to a System on a Chip (SoC) is disclosed. The P-Bus control protection system comprises a control subsystem and a plurality of functional subsystems. Each of the control subsystem and functional subsystems has a corresponding P-Bus circuit. All P-Bus circuits form a ring P-Bus. A first subsystem among the control subsystem and the plurality of functional subsystems, as a master device, is configured to send a packet to request control of power and/or resources through its corresponding P-Bus circuit. Other subsystems are slave devices. The packet comprises an SoC identifier (ID) and a slave ID. The slave ID is an ID of a target slave device to which the packet is directed. The SOC ID and the slave ID are utilized to jointly indicate a specific subsystem located in a specific SoC. A second subsystem among the control subsystem and the plurality of functional subsystems, as a slave device, is configured to receive the packet through its corresponding P-Bus circuit, to decode the packet for determining whether the packet is directed to the second subsystem based on the SoC ID and the slave ID carried in the packet, and to execute corresponding operations if the packet is directed to the second subsystem.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
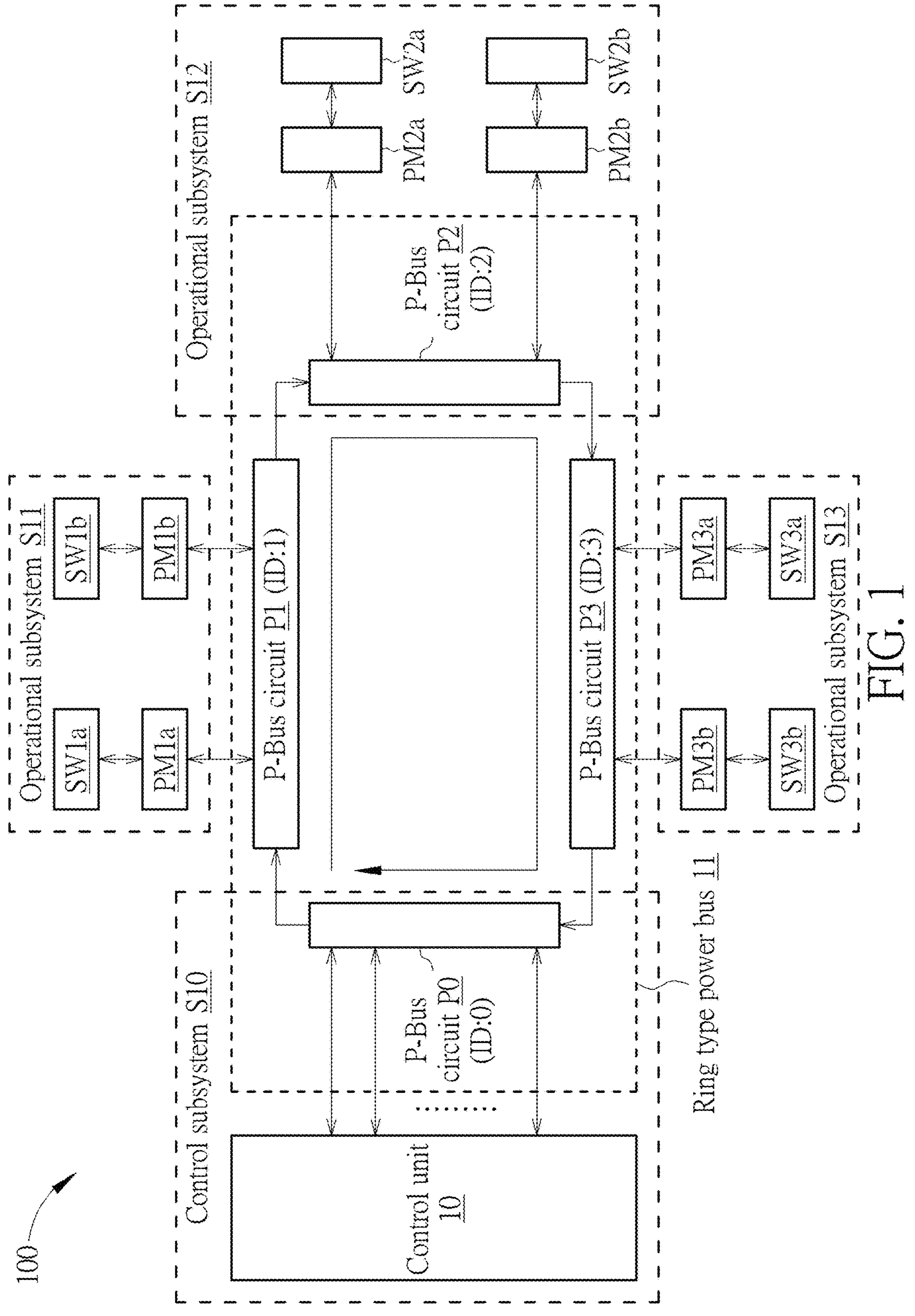
FIG. 1 is a block diagram of a power bus (P-Bus) control protection system according to an embodiment of the present invention.

FIG. 1 is a block diagram of a power bus (P-Bus) control protection system 100 according to an embodiment of the present invention. The P-Bus control protection system 100 can be applicable to a System on a Chip (SoC). The P-Bus can be applied to the N3 process family for achieving wire-reduction and cost-reduction mechanisms, but this disclosure is not limited thereto. The P-Bus control protection system 100 includes a control subsystem S10 comprising a control unit 10 and a P-Bus circuit P0, and the P-Bus control protection system 100 further includes a plurality of functional subsystems S11 to S13 having corresponding P-Bus circuits P1 to P3. It should be noted that the P-Bus control protection system 100 is part of, or the entirety of, an SoC, that is, the P-Bus control protection system 100 is within the SoC. The control unit 10 can be a low power state control unit for performing a suspend/resume function. The plurality of P-Bus circuits P0 to P3 can be coupled in series to form a ring type power bus 11, for example, a bidirectional ring or a unidirectional ring. For the sake of convenience, the present disclosure takes the ring type power bus 11 as a unidirectional ring as an example, but the present disclosure is not limited to this. The ring type power bus 11 is coupled to the control unit 10 through the P-Bus circuit P0, and controlled by the control unit 10. The ring type power bus 11 can be regarded as interfaces/stations/nodes for performing packet transactions in the P-Bus control protection system 100, such as among the control unit, power switches (SW), and always-on (AO) power managements, wherein the packet can be used to request power and/or resource control. In FIG. 1, for the functional subsystems S11, an AO power management PM1*a* coupled to a power switch SW1*a*, and an AO power management PM1*b* coupled to a power switch SW1*b* are coupled to the P-Bus circuit P1. For the functional subsystems S12, an AO power management PM2*a* coupled to a power switch SW2*a*, and an AO power management PM2*b* coupled to the power switch SW2*b* are coupled to the P-Bus circuit P2. For the functional subsystems S13, an AO power management PM3*a* coupled to a power switch SW3*a*, and an AO power management PM3*b* coupled to the power switch SW3*b* are coupled to the P-Bus circuit P3. Particularly, FIG. 1 illustrates the P-Bus control protection system 100 having the unidirectional ring type power bus. In another embodiment, a bidirectional ring type power bus can also be applied to the P-Bus control protection system.

In the P-Bus control protection system 100, a master device is the initiator of a packet, while any other device related to the ring type power bus, including the target receiver of the packet, is considered a slave device. Both master and slave devices have corresponding IDs. For example, a control subsystem S10 can be regarded as a master device to control of power and/or resources to a slave device, such as the functional subsystem S11 through the ring type power bus 11. Further, the slave device receives the packet through its P-Bus circuit. The slave device decodes the packet and checks the SoC identifier (SoC ID) and slave ID to determine if the packet is directed to it. If the packet is directed to the slave device, it will execute the corresponding operation according to the packet. If not, it will forward the packet to the next slave device on the ring P-Bus. In another embodiment, a master device can be one functional subsystem, not limited to the control subsystem S10. The master device can request a power/resource control to a slave device. For example, the functional subsystem S11 can be regarded as a master device, and it can request a power/resource control to another functional subsystem S12, which is regarded as a slave device.

In the P-Bus control protection system 100, the SoC identifier (ID) is introduced and combined with a slave ID for indicating a target slave device in each packet of the plurality of packets transmitted among the control subsystem S10 and the plurality of functional subsystems S11 to S13, wherein the SoC ID may have N bits, which is used as guard bits for the slave ID. It should be noted that in the technology of transmitting packets via P-Bus, the initiator of the packet can be regarded as a master (MST) device, and other device related to the P-Bus can be regarded as a slave (SLV) device. Specifically, the target receiver of the packet can be regarded as a target slave device, wherein both the master device and the slave device have corresponding IDs, and the master device and the target slave device are any different subsystems of the control subsystem S10 and the plurality of functional subsystems S11 to S13. For one packet transmitted on the ring type power bus 11, the P-Bus circuit can check the SoC ID and the slave ID of the packet for determining if the packet is for the subsystem associated with itself, and this will terminate at a target slave device, otherwise the packet will be forwarded to the next slave device. In other words, the P-Bus circuit is designed to check the SoC ID and the slave ID of the packet. By checking these IDs, the P-Bus circuit determines if the packet belongs to the subsystem associated with that particular P-Bus circuit. If the IDs match, it means the packet is intended for the subsystem connected to that P-Bus circuit, and the packet is received. If the IDs don't match, it means the packet is intended for a different subsystem, and the P-Bus circuit forwards the packet to the next P-Bus circuit in the ring.

In the embodiment, the SoC includes the control subsystem S10 and the plurality of functional subsystems S11 to S13. The SoC ID is an identifier code of the SoC. The slave ID is an identifier code of a target slave device to which the packet is directed, for example, the target slave device may be one subsystem among the control subsystem S10 and the plurality of functional subsystems S11 to S13. Here, different SoCs have different SoC IDs. Different subsystems in different SoCs may have different IDs. SoC ID has N bits, which are used as guard bits for the slave device ID, wherein N is a positive integer. In the embodiment, the power switches SW1*a* to SW3*b* can be multi-threshold complementary metal oxide semiconductors (MTCMOS). The MTCMOS power switch technology is an effective leakage reduction technology in a deep sub-micro-process mode. Since the ring type power bus 11 is introduced to the P-Bus control protection system 100, the cost (say, "complexity") of the top wire sideband area of the SoC can be greatly reduced (−90%).

Figure 2:
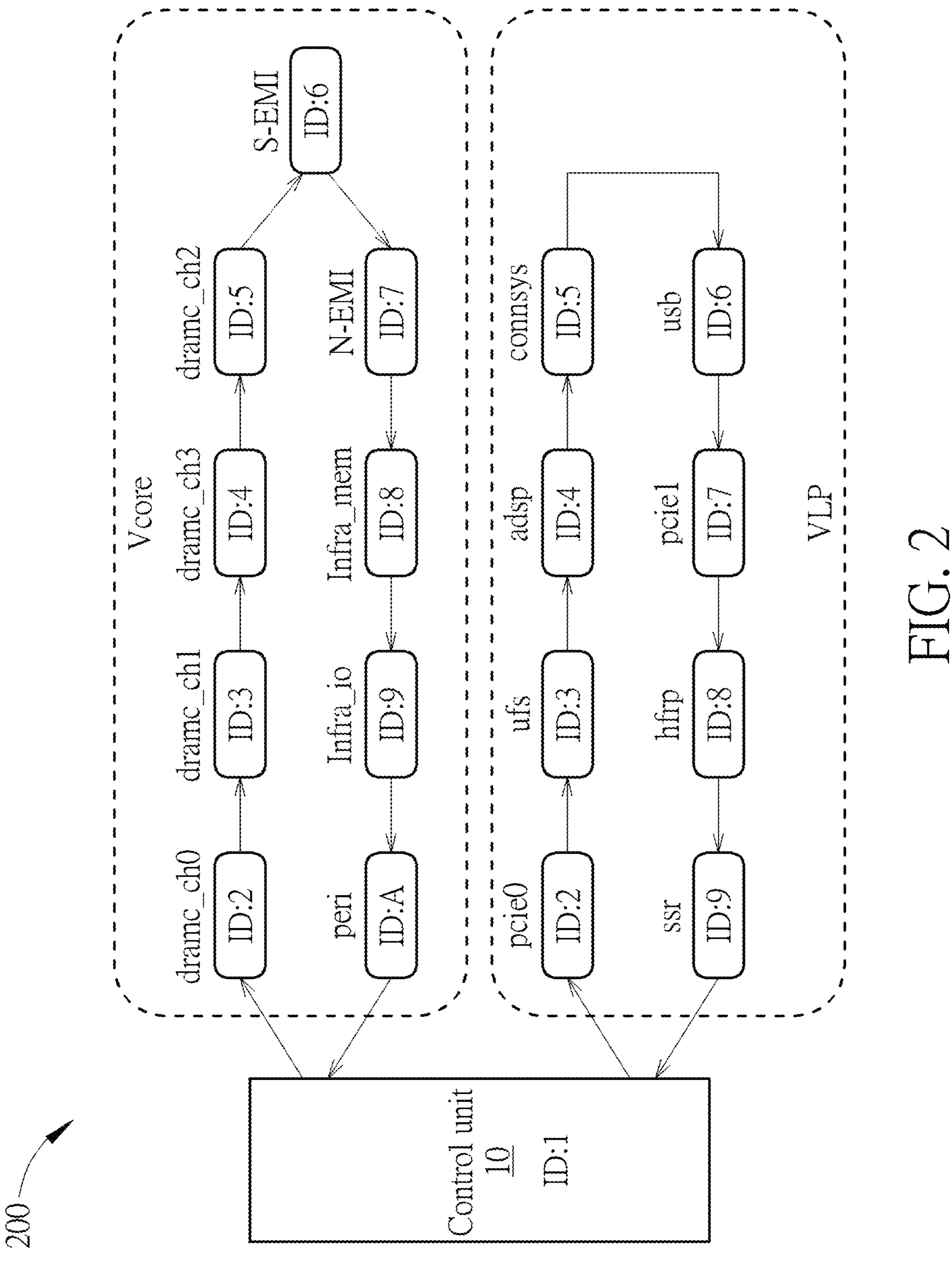
FIG. 2 is an illustration of introducing a power-always-on domain and an adjustable power domain to the P-Bus control protection system in FIG. 1.

FIG. 2 is an illustration of introducing a power-always-on domain Vcore and an adjustable power domain VLP to the P-Bus control protection system 100. For avoiding ambiguity, the P-Bus control protection system in FIG. 2 is called as a P-Bus control protection system 200 hereafter. As mentioned previously, the P-Bus control protection system introduces the ring type power bus for reducing the complexity of the top wire sideband area of the SoC. In the P-Bus control protection system 200, the ring type power bus can be used for connecting and controlling subsystems of the power-always-on domain Vcore or subsystems of the adjustable power domain VLP. In other embodiments, the P-Bus control protection system 200 has the bidirectional ring type power bus. In the example of FIG. 2, the power-always-on domain Vcore can include subsystems dramc_ch0 to dramc_ch3, a subsystem S-EMI, a subsystem N-EMI, a subsystem infra_mem, a subsystem infra_io, and a subsystem peri, whose clocks and power supplies are always turned on. The power-always-on domain Vcore is coupled to the control unit 10 within the control subsystem S10 and controlled by the control unit 10. It is noted that P-Bus circuits are not illustrated in FIG. 2. In the power-always-on domain Vcore, the subsystems dramc_ch0 to dramc_ch3 are associated with the control of channels of the dynamic random-access memory (DRAM). The subsystems S-EMI and N-EMI are associated with the control of extended memory interfaces of the SoC. The subsystems infra_mem and infra_io are associated with the control of infrastructures of the SoC. The subsystem peri is associated with the control of peripherals of the SoC. Here, each subsystem of the power-always-on domain Vcore has its own ID.

In the example of FIG. 2, the adjustable power domain VLP can include subsystems pcie 0 and pcie1, a subsystem ufs, a subsystem adsp, a subsystem connsys, a subsystem ssr, a subsystem hfrp, and a subsystem usb. the clocks and power supplies of these subsystems can be turned on or turned off. The adjustable power domain VLP is coupled to the control unit 10 within the control subsystem S10 and controlled by the control unit 10. In the adjustable power domain VLP, the subsystems pcie0 and pcie1 are associated with the control of peripheral component interconnect express (PCIe) interfaces. The subsystem ufs is associated with the control of a universal flash storage. The subsystem adsp is associated with the control of audio hardware and applications. The subsystem connsys is associated with the control of Wi-Fi or Global Positioning System (GPS). The subsystem ssr is associated with the control of security service. The subsystem hfrp is associated with the control of an encoding or/and decoding mechanism of the SoC. The subsystem usb is associated with the control of a universal serial bus (USB). Here, each subsystem of the adjustable power domain VLP has its own ID. Details of protecting data transactions of the P-Bus control protection systems 100 and 200 are illustrated later.

At present, the format of packets transmitted by the P-Bus has been defined by related protocols, so that the SoC transmits packets according to a predefined format. However, in the P-Bus control protection system 100, it can transmit the SoC ID by using certain bits in the existing field (e.g., the total number of bits remains unchanged), and even changes the order of the fields of the protocol packet. For example, it transmits the SoC ID and slave ID at the front-end of the packet. Here, data of the packet can be written into a corresponding register group (RG) of the subsystem through packet transactions. The "original" format of each packet can include a plurality of fields, as illustrated in Tables T1 and T2.

TABLE T1

| Configurations | Packet Function | Packet Type (4 bits) | Master ID | Slave ID | Packet ID |
|---|---|---|---|---|---|
| Software | Config. Write | 4'b0001 | 6 bits | 6 bits | 8 bits |
| | Config. Read | 4'b0010 | 6 bits | 6 bits | 8 bits |
| Hardware | Read Ack | 4'b0011 | 6 bits | 6 bits | 8 bits |
| | Power Request | 4'b0100 | 6 bits | 6 bits | 8 bits |
| | Power Ack | 4'b0101 | 6 bits | 6 bits | 8 bits |
| | Resource Request | 4'b0110 | 6 bits | 6 bits | 8 bits |
| | Resource Ack | 4'b0111 | 6 bits | 6 bits | 8 bits |

TABLE T2

| Configurations | Master Address | Slave Address | Data |
|---|---|---|---|
| Software | 12 bits | 12 bits | 32 bits |
| | 12 bits | 12 bits | 32 bits |
| Hardware | 12 bits | 12 bits | 32 bits |
| | 12 bits | 12 bits | 32 bits |
| | 12 bits | 12 bits | 32 bits |
| | 12 bits | 12 bits | 32 bits |
| | 12 bits | 12 bits | 32 bits |

In the embodiment, the format of each packet comprises fields for packet type, master ID, slave ID, packet ID, master address, slave address, and data content. The packet type field is used to indicate the type of packet, for example, to request a read or write operation, power request or ack, etc. The master ID field is used to indicate an identifier of the master device that originated the packet, the slave ID field is used to indicate an identifier of the target slave device to which the packet is directed, the packet ID is used to identify the current packet, and the master address/slave address is used to indicate the address of corresponding RG of the master/slave device. In order to prevent the register group (RG) of any subsystem from being written by mistake, N bits carrying information of SoC ID can be incorporated into at least one field of the format of each packet, as illustrated below, that is, the SoC TD is served as N guard bits for the slave ID, wherein N is an integer.

First, the SoC TD may be predefined with N bits. Different SoC TDs can be used for differentiating various SoC devices. For example, an SoC TD "2'b01" having two bits corresponds to one SoC. An SoC TD "2'b10" having two bits corresponds to another SoC. Then, when the control unit 10 sends a packet, the control unit 10 can append the SoC TD to the slave TD for accurately indicating a specific slave device in a particular SoC. For example, the SoC TD "2'b10" can be appended to a 4-bit Slave ID to form a string as [2'b10 4-bit Slave TD], which represents a certain subsystem of one SoC. Similarly, the SoC ID "2'b01" can be appended to 4-bit Slave TD to form a string as ["2'b01" 4-bit Slave TD], which represents a certain subsystem of another SoC. In other words, N guard bits (SoC TD) and the slave TD bits can form a string having N+M bits. M is a bit length of the slave TD. After the N guard bits (the SoC TD) are introduced, the format of each packet can be updated in Tables T3 and T4.

TABLE T3

| | Packet Function | Packet Type (4 bits) | Master ID | Guard bits | Slave ID | Packet ID |
|---|---|---|---|---|---|---|
| Software | Config. Write | 4'b0001 | 6 bits | 2 bits | 4 bits | 8 bits |
| | Config. Read | 4'b0010 | 6 bits | 2 bits | 4 bits | 8 bits |
| Hardware | Read Ack | 4'b0011 | 6 bits | 2 bits | 4 bits | 8 bits |
| | Power Request | 4'b0100 | 6 bits | 2 bits | 4 bits | 8 bits |
| | Power Ack | 4'b0101 | 6 bits | 2 bits | 4 bits | 8 bits |
| | Resource Request | 4'b0110 | 6 bits | 2 bits | 4 bits | 8 bits |
| | Resource Ack | 4'b0111 | 6 bits | 2 bits | 4 bits | 8 bits |

TABLE T4

| Configurations | Master Address | Slave Address | Data |
|---|---|---|---|
| Software | 12 bits | 12 bits | 32 bits |
| | 12 bits | 12 bits | 32 bits |
| Hardware | 12 bits | 12 bits | 32 bits |
| | 12 bits | 12 bits | 32 bits |
| | 12 bits | 12 bits | 32 bits |
| | 12 bits | 12 bits | 32 bits |
| | 12 bits | 12 bits | 32 bits |

It should be understood that, originally, the slave ID field is 6 bits. In the P-Bus control protection systems 100, two of these bits can be used as the SoC ID, and the other 4 bits are still used as the slave ID. However, this only applies to scenarios where the maximum number of control subsystem and functional subsystems in the P-Bus ring is 24=16. If there are more subsystems, some bits in the packet ID field can be used as the SoC ID, in which case the slave ID can still be 6 bits. In other embodiments, any other field of the packer format can be used as the SoC ID, with the remaining bits still used as an indication of the original function. In other words, in one embodiment, the SoC ID is carried in the packet ID field. In another embodiment, at least one bit of the SoC ID is carried in the slave ID field. In another embodiment, the SoC ID and the slave ID are jointly carried in the slave ID field.

As previously illustrated, the P-Bus control protection system 100 can incorporate N guard bits (i.e., the SoC ID) into the format of each packet for differentiating various SoC devices. Since two-dimensional ID information (i.e., SoC ID and slave ID) are used in the P-Bus control protection system 100, a risk of mis-control or mis-written (i.e., subsystem being written incorrectly) can be minimized. In practice, each P-Bus circuit can check the SoC ID (taken as N guard bits for the slave ID) and the slave ID. When the SoC ID fail to be validated, a P-Bus circuit can generate a guard bit check error message. After the guard bit check error message is generated, the P-Bus circuit discards the packet for avoiding writing incorrect data to the subsystem register. Conversely, when the SoC ID and the slave ID of the packet are successfully validated, the P-Bus circuit can generate an acknowledgment (ACK) message. The P-Bus circuit can receive the packet to write subsystem data to the register for controlling a power switch of a subsystem coupled to the P-Bus circuit.

In the P-Bus control protection system 100, to further minimize the latency of validating each packet, the control unit 10 can allocate the SoC ID and the slave ID of each packet to a packet front-end to raise their priorities. For example, Table T3 can be adjusted to Table T5 by configuring a processing priority of two guard bits (i.e., the SoC TD) to be the highest processing priority of all fields. Table T5 is illustrated below.

TABLE T5

| | Packet Function | Guard bits | Slave ID | Packet Type (4 bits) | Master ID | Packet ID |
|---|---|---|---|---|---|---|
| Software | Config. Write | 2 bits | 4 bits | 4'b0001 | 6 bits | 8 bits |
| | Config. Read | 2 bits | 4 bits | 4'b0010 | 6 bits | 8 bits |
| Hardware | Read Ack | 2 bits | 4 bits | 4'b0011 | 6 bits | 8 bits |
| | Power Request | 2 bits | 4 bits | 4'b0100 | 6 bits | 8 bits |
| | Power Ack | 2 bits | 4 bits | 4'b0101 | 6 bits | 8 bits |
| | Resource Request | 2 bits | 4 bits | 4'b0110 | 6 bits | 8 bits |
| | Resource Ack | 2 bits | 4 bits | 4'b0111 | 6 bits | 8 bits |

In Table T5, fields for the guard bits (i.e., the SoC ID) and the Slave TD have high priorities to be identified. Therefore, when the guard bits fail to be validated (i.e., including another SoC TD information), the packet is immediately discarded. As a result, the latency of validating each packet can be minimized.

In the P-Bus control protection system 100, any technology or hardware modification falls into the scope of the present invention. For example, the control unit 10 can generate power switch requests carried by the plurality of packets. Then, the control unit 10 can transmit the plurality of packets to the plurality of P-Bus circuits for controlling the power switches according to the power switch requests. In another embodiment, the P-Bus circuit can be used for transmitting resource requests from the subsystem to the control unit 10. Further, each P-Bus circuit can include a decoder and an encoder. The decoder and the encoder are pair-wised circuits. In brief, the decoder receives and decodes the packet to determine whether the packet is directed to its subsystem. When the packet is not directed to its subsystem, the encoder encodes the decoded packet to relay/forwards the encoded packet to the next subsystem following the current subsystem.

Figure 3:
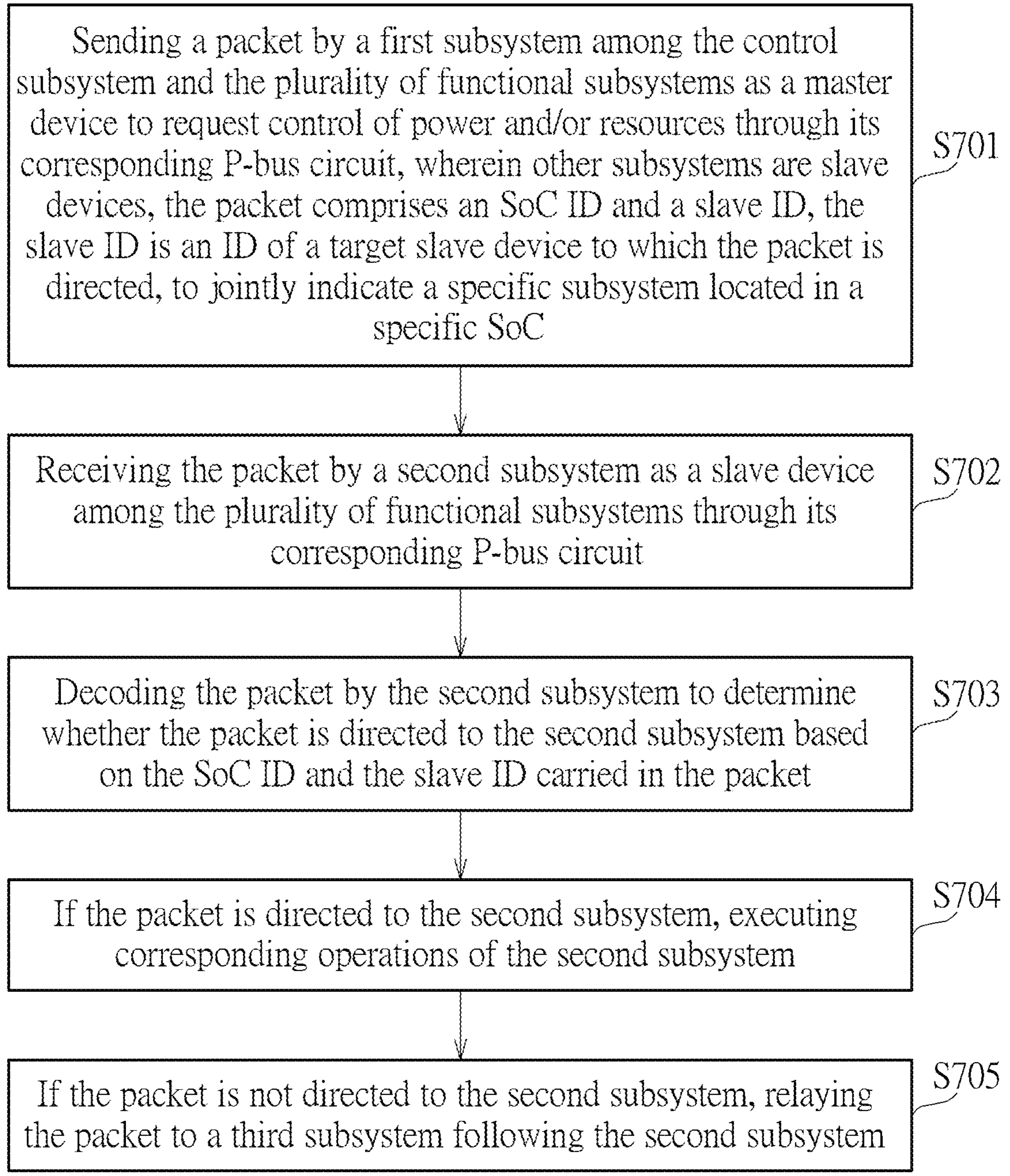
FIG. 3 is a flow chart of performing a P-Bus control protection method by the P-Bus control protection system in FIG. 1.

FIG. 3 is a flow chart of performing a P-Bus control protection method by the P-Bus control protection system 100. The P-Bus control protection method includes step S701 to step S705. Any technology or hardware modification falls into the scope of the present invention. Step S701 to step S705 are illustrated below.

step S701: sending a packet by a first subsystem among the control subsystem and the plurality of functional subsystems as a master device to request control of power and/or resources through its corresponding P-Bus circuit, wherein other subsystems are slave devices, the packet comprises an SoC ID and a slave ID, the slave ID is an ID of a target slave device to which the packet is directed, to jointly indicate a specific subsystem located in a specific SoC;

step S702: receiving the packet by a second subsystem as a slave device among the control subsystem and the plurality of functional subsystems through its corresponding P-Bus circuit;

step S703: decoding the packet by the second subsystem to determine whether the packet is directed to the second subsystem based on the SoC ID and the slave ID carried in the packet;

step S704: if the packet is directed to the second subsystem, executing corresponding operations of the second subsystem;

step S705: if the packet is not directed to the second subsystem, relaying the packet to a third subsystem following the second subsystem.

Details of step S701 to step S705 are previously illustrated. Thus, they are omitted here. In the P-Bus control protection system 100, for software technologies, the slave ID and additional guard bits for different SoC devices can be generated. Since the guard bits can be used for differentiating various SoC devices, unexpected packet can be blocked or discarded when the guard bit check error message interrupts system reception for a debugger. Therefore, a risk of writing the erroneous packet data to the P-Bus subsystem register can be reduced. For hardware technologies, the decoder of the P-Bus may be modified to differentiate various SoC devices according to the guard bits and the slave ID, blocking erroneous packet data, and triggering interruptions for the debugger. Further, for minimizing the latency of validating each packet, the guard bits and the slave ID can be allocated to the packet front-end to raise their priorities. Therefore, the efficiency of packet transactions can be increased.

To sum up, the present invention discloses a P-Bus control protection method and a P-Bus control protection system. The P-Bus control protection system incorporates the SoC ID as guard bits to differentiate between various SoC devices. Further, the guard bits and the slave ID can be allocated to the packet front-end to raise their priorities so as to minimize the latency involved in validating each packet. Therefore, the P-Bus control protection system can avoid writing incorrect packet data to the P-Bus subsystem register and increase the efficiency of packet transactions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power bus (P-Bus) control protection method applicable to a System on a Chip (SoC), wherein the SoC comprises a control subsystem and a plurality of functional subsystems, each of the control subsystem and functional subsystems has a corresponding P-Bus circuit, all P-Bus circuits form a P-Bus, and the method comprising:

integrating an SoC identifier (ID) with a packet type field, a master ID field, a packet ID field, a master address field, a slave address field, and/or a data content field;

sending a packet by a first subsystem among the control subsystem and the plurality of functional subsystems, wherein the first subsystem is taken as a master device to request control of power and/or resources through its corresponding P-Bus circuit, other subsystems are slave devices, and the packet comprises the SoC ID and a slave ID, wherein the slave ID is an ID of a target slave device to which the packet is directed, and the SoC ID and the slave ID are utilized to jointly indicate a specific subsystem located in a specific SoC;

receiving the packet by a second subsystem as a slave device among the control subsystem and the plurality of functional subsystems through its corresponding P-Bus circuit;

decoding the packet by the second subsystem to determine whether the packet is directed to the second subsystem based on the SoC ID and the slave ID carried in the packet; and if the packet is directed to the second subsystem, executing corresponding operations by the second subsystem;

wherein the packet has a predefined format comprising the packet type field, the master ID field, a slave ID field, the packet ID field, the master address field, the slave address field, and the data content field.

2. The method of claim 1, wherein the packet has a predefined format comprising a slave ID field and a packet ID field, and the SoC ID is carried in the packet ID field.

3. The method of claim 1, wherein the packet has a predefined format comprising a slave ID field, and the SoC ID and the slave ID are jointly carried in the slave ID field.

4. The method of claim 1, further comprising:

if the packet is not directed to the second subsystem, relaying the packet to a third subsystem following the second subsystem, wherein the third subsystem is among the control subsystem and the plurality of functional subsystems.

5. The method of claim 1, wherein the SoC ID and the slave ID are allocated to fields of a front-end of the packet.

6. The method of claim 1, further comprising:

if it is determined that the packet is not directed to the second subsystem after decoding the packet, encoding the decoded packet by an encoder of the second subsystem to relay the encoded packet to a third subsystem.

7. The method of claim 1, further comprising:

generating a guard bit check error message when the SoC ID of the packet fails to be validated; and discarding the packet after the guard bit check error message is generated.

8. The method of claim 1, further comprising:

generating an acknowledgment message when the SoC ID and the slave ID of the packet are successfully validated; and controlling a power switch of the second subsystem by the control subsystem through its corresponding P-Bus circuit.

9. The method of claim 1, wherein the control subsystem is configured to control the plurality of functional subsystems under a power-always-on domain or an adjustable power domain through the P-Bus.

10. A power bus (P-Bus) control protection system applicable to a System on a Chip (SoC), comprising:

a control subsystem; and a plurality of functional subsystems;

wherein each of the control subsystem and the plurality of functional subsystems has a corresponding P-Bus circuit, and all P-Bus circuits form a P-Bus;

wherein a packet has a predefined format comprising a packet type field, a master ID field, a slave ID field, a packet ID field, a master address field, a slave address field, and a data content field;

wherein an SoC identifier (ID) is integrated with the packet type field, the master ID field, the packet ID field, the master address field, the slave address field, and/or the data content field;

wherein a first subsystem among the control subsystem and the plurality of functional subsystems, as a master device, is configured to send the packet to request control of power and/or resources through its corresponding P-Bus circuit, wherein other subsystems are slave devices, and the packet comprises the SoC (ID) and a slave ID, wherein the slave ID is an ID of a target slave device to which the packet is directed, and the SoC ID and the slave ID are utilized to jointly indicate a specific subsystem located in a specific SoC; and wherein a second subsystem among the control subsystem and the plurality of functional subsystems, as a slave device, is configured to receive the packet through its corresponding P-Bus circuit, to decode the packet for determining whether the packet is directed to the second subsystem based on the SoC ID and the slave ID carried in the packet, and to execute corresponding operations if the packet is directed to the second subsystem.

11. The system of claim 10, wherein the packet has a predefined format comprising a slave ID field and a packet ID field, and the SoC ID is carried in the packet ID field.

12. The system of claim 10, wherein the packet has a predefined format comprising a slave ID field, and the SoC ID and the slave ID are jointly carried in the slave ID field.

13. The system of claim 10, wherein if the packet is not directed to the second subsystem, the second subsystem relays the packet to a third subsystem following the second subsystem, wherein the third subsystem is among the control subsystem and the plurality of functional subsystems.

14. The system of claim 10, wherein the SoC ID and the slave ID are allocated to fields of a front-end of the packet.

15. The system of claim 10, wherein if it is determined that the packet is not directed to the second subsystem after decoding the packet, an encoder of the second subsystem encodes the decoded packet to relay the encoded packet to a third subsystem.

16. The system of claim 10, wherein the second subsystem generates a guard bit check error message when the SoC ID of the packet fails to be validated, and the packet is discarded by the second subsystem after the guard bit check error message is generated.

17. The system of claim 10, wherein the second subsystem generates an acknowledgment message when the SoC ID and the slave ID of the packet are successfully validated, and the control subsystem controls a power switch of the second subsystem through its corresponding P-Bus circuit.

18. The system of claim 1, wherein the control subsystem is configured to control the plurality of functional subsystems under a power-always-on domain or an adjustable power domain through the P-Bus.

* * * * *